(12) United States Patent
Matsushita et al.

(10) Patent No.: US 9,284,384 B2
(45) Date of Patent: Mar. 15, 2016

(54) METHOD FOR PRODUCING POLYMERIZATION CATALYST COMPOSITION, POLYMERIZATION CATALYST COMPOSITION, METHOD FOR PRODUCING POLYMER COMPOSITION, AND POLYMER COMPOSITION

(71) Applicant: BRIDGESTONE CORPORATION, Chuo-ku, Tokyo (JP)

(72) Inventors: Junko Matsushita, Tachikawa (JP); Shojiro Kaita, Oizumi-machi (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 14/394,428

(22) PCT Filed: Apr. 18, 2013

(86) PCT No.: PCT/JP2013/002637
§ 371 (c)(1),
(2) Date: Oct. 14, 2014

(87) PCT Pub. No.: WO2013/157272
PCT Pub. Date: Oct. 24, 2013

(65) Prior Publication Data
US 2015/0112021 A1    Apr. 23, 2015

(30) Foreign Application Priority Data

Apr. 18, 2012 (JP) ................................. 2012-095074
Jun. 18, 2012 (JP) ................................. 2012-137175

(51) Int. Cl.
| | | |
|---|---|---|
| C08F 2/44 | (2006.01) | |
| C08F 36/04 | (2006.01) | |
| C08F 136/06 | (2006.01) | |
| C08K 3/36 | (2006.01) | |
| B60C 1/00 | (2006.01) | |

(52) U.S. Cl.
CPC ................. *C08F 2/44* (2013.01); *B60C 1/0016* (2013.04); *C08F 36/04* (2013.01); *C08F 136/06* (2013.01); *C08K 3/36* (2013.01)

(58) Field of Classification Search
CPC .......... C08F 2/44; C08F 36/04; C08F 136/06; C08K 3/36

USPC ...................... 526/90; 524/836; 502/104, 117
See application file for complete search history.

(56) References Cited

U.S. PATENT DOCUMENTS

| | | | |
|---|---|---|---|
| 6,130,299 A | 10/2000 | Sone et al. | |
| 6,949,489 B1 | 9/2005 | Barbotin et al. | |
| 7,989,565 B2 * | 8/2011 | Gibson et al. | .................. 526/161 |
| 2004/0241251 A1 * | 12/2004 | Thiele et al. | .................. 424/601 |
| 2005/0090383 A1 | 4/2005 | Thiele et al. | |
| 2006/0116278 A1 | 6/2006 | Carpentier et al. | |
| 2010/0010181 A1 * | 1/2010 | Luo et al. | ...................... 526/212 |

FOREIGN PATENT DOCUMENTS

| | | | |
|---|---|---|---|
| CN | 101516927 A | | 8/2009 |
| JP | 2002-179722 A | | 6/2002 |
| JP | 2002179722 A | * | 6/2002 |
| JP | 2003-514079 A | | 4/2003 |
| JP | 2006-516997 A | | 7/2006 |
| JP | 2010-504405 A | | 2/2010 |
| WO | 2007/129670 A1 | | 11/2007 |
| WO | 2012/014421 A1 | | 2/2012 |

OTHER PUBLICATIONS

Timothy J. Woodman, et al., "Heterogenized "Ligand-Free" Lanthanide Catalysts for the Homo- and Copolymerization of Ethylene and 1,3-Butadiene", Macromolecules, 2005, pp. 3060-3067, vol. 38.
Japanese Office Action issued in corresponding JP Application No. 2012-095074, dated Jun. 9, 2015.
Japanese Office Action issued in corresponding JP Application No. 2012-095074, dated Aug. 4, 2015.

* cited by examiner

*Primary Examiner* — Kelechi Egwim
(74) *Attorney, Agent, or Firm* — Sughrue Mion, PLLC

(57) ABSTRACT

A method for producing a polymer containing silica that does not involve long kneading time, and a polymer composition having an intended low heat generation property. A polymerization catalyst composition is produced by mixing and aging a second element and a third element, and then adding a first element to the mixture to react the first element with the mixture. The first element contains a compound that contains a rare earth metal element, the second element contains a compound represented by the following formula (X), and the third element contains silica. $YR^1_a R^2_b R^3_c$ (X) (In the formula, Y is a metal; $R^1$ and $R^2$ are hydrogen atoms or hydrocarbon groups; and $R^3$ is a hydrocarbon group, and $R^1$, $R^2$, and $R^3$ are the same as or different from each other, a, b, and c are 0 or 1.).

4 Claims, No Drawings

METHOD FOR PRODUCING POLYMERIZATION CATALYST COMPOSITION, POLYMERIZATION CATALYST COMPOSITION, METHOD FOR PRODUCING POLYMER COMPOSITION, AND POLYMER COMPOSITION

CROSS REFERENCE TO RELATED APPLICATIONS

This application is a National Stage of International Application No. PCT/JP2013/002637 filed Apr. 18, 2013, claiming priority based on Japanese Patent Application Nos. 2012-095074, filed Apr. 18, 2012 and 2012-137175, filed Jun. 18, 2012, the contents of all of which are incorporated herein by reference in their entirety.

TECHNICAL FIELD

The present invention relates to a method for producing a polymerization catalyst composition, a polymerization catalyst composition produced by the method, a method for producing a polymer composition, and a polymer composition.

The term "polymer" as used herein is meant to encompass not only polymers but also oligomers.

BACKGROUND ART

A demand for vehicles with lower fuel consumption is now growing with the global movement toward the reduction in carbon dioxide emissions, resulting from the growing interest in environmental issues. To respond to such a demand, tires are required to have low rolling resistance. The low rolling resistance of tires may be achieved, for example, by using a rubber composition with low heat generation property. The low heat generation property is conventionally achieved by, for example, using a polymer having increased affinity for carbon black and silica. Refer, for example, to WO 2007/129670 (PTL 1), in which the affinity between fillers and rubber component is increased to reduce the heat generation from the rubber composition. Such a rubber composition can form a tire with low hysteresis loss. However, as the demand for vehicles with lower fuel consumption grows even further, tires are also required to be improved further to have even lower heat generation property. Additionally, the heat generation may be also reduced by, for example, lengthening the kneading time, which however reduces the heat generation only in a limited way.

A catalyst composition containing a rare earth metal is one conventional polymerization catalyst composition known in the art used for synthesizing a polymer. One example of such a catalyst composition contains (i) a compound that contains a rare earth element (REE-containing compound), (ii) an organic aluminum compound, and (iii) an ionic compound. The REE-containing compound contains a rare earth element compound (REE compound) or a reactant of the REE compound with a Lewis base. The ionic compound, numbered as (iii), of the catalyst composition involves cost problem, so there has been a need for a compound substituting the number (iii) compound. Silica has been commonly used to substitute the ionic compound. Refer to *Macromolecules* (2005) 38, pp. 3060-3067 by T. J. Woodman et al. (NPL 1). However, the method described in NPL 1 requires calcination of silica, which also involves cost problem.

CITATION LIST

Patent Literature

PTL 1: WO 2007/129670
PTL 2: JP 2003-514079 A

Non-Patent Literature

NPL 1: T. J. Woodman et al. *Macromolecules* (2005) 38, pp. 3060-3067

SUMMARY OF INVENTION

Technical Problem

An object of the present invention is to provide a method for producing a polymerization catalyst composition that enables synthesis of a polymer composition without using expensive compounds nor conducting special process. Another object of the present invention is to provide a method for producing a polymerization catalyst composition and the polymerization catalyst composition, with which silica is highly-dispersed in the resulting polymers, so that kneading of silica with polymers, or a use of coupling agent or a compatibilizer can be omitted or minimized.

A further object of the present invention is to provide a method for producing a polymer composition having an intended low heat generation property. Another object of the present invention is to provide a polymer composition having an intended low heat generation property.

Solution to Problem

A method for producing a polymerization catalyst composition according to the present invention includes mixing and aging a second element and a third element, and then adding a first element to the mixture to react the first element with the mixture,
wherein the first element is a compound that contains a rare earth element (REE-containing compound) wherein the REE-containing compound contains a rare earth element compound (REE compound) or a reactant of the REE compound with a Lewis base; the second element contains a compound represented by the following formula (X):

$$YR^1_a R^2_b R^3_c \qquad (X)$$

wherein: Y is a metal selected from Group 1, Group 2, Group 12, and Group 13 of the periodic table; $R^1$ and $R^2$ are hydrogen atoms or hydrocarbon groups each having 1 to 10 carbon atoms; and $R^3$ is a hydrocarbon group having 1 to 10 carbon atoms, $R^1$, $R^2$, and $R^3$ are the same as or different from each other; with a being 1 and b and c both being 0 when Y is a metal selected from Group 1 of the periodic table, a and b being 1 and c being 0 when Y is a metal selected from Group 2 and Group 12 of the periodic table, and a, b, and c are all 1 when Y is a metal selected from Group 13 of the periodic table; and the third element contains silica.

Other preferred examples of the REE-containing compound include a complex represented by the following general formula (i) or (ii):

$$MX_2 \cdot Lw \qquad (i)$$

$$MX_3 \cdot Lw \qquad (ii)$$

wherein: M represents a lanthanoid element, scandium, or yttrium; X each independently represent a hydrogen atom, a halogen atom, an alkoxy group, a thiolate group, an amide group, a silyl group, an aldehyde residue, a ketone residue, a carboxylic acid residue, a thicarboxylic acid residue, a phosphorous compound residue, a substituted or unsubstituted cyclopentadienyl, or a substituted or unsubstituted indenyl; L represents a Lewis base; and w represents 0 to 3.

Preferably, the REE-containing compound or the reactant of the REE compound with the Lewis base does not have a bond between the rare earth element and the carbon.

A method for producing a polymer composition according to the present invention includes forming a polymer component by polymerizing at least one of a conjugated diene compound and a unconjugated olefin in the presence of a polymerization catalyst composition obtained by mixing and aging a second element and a third element, and then adding a first element to the mixture to react the first element with the mixture, wherein the first element is a compound that contains a rare earth element (REE-containing element) wherein the REE-containing compound contains a rare earth element compound (REE compound) or a reactant of the REE compound with a Lewis base; the second element contains a compound represented by the following general formula (X):

$$YR^1{}_aR^2{}_bR^3{}_c \quad (X)$$

wherein: Y is a metal selected from Group 1, Group 2, Group 12, and Group 13 of the periodic table; $R^1$ and $R^2$ are hydrogen atoms or hydrocarbon groups each having 1 to 10 carbon atoms; and $R^3$ is a hydrocarbon group having 1 to 10 carbon atoms, $R^1$, $R^2$, and $R^3$ are the same as or different from each other, with a being 1 and b and c both being 0 when Y is a metal selected from Group 1 of the periodic table, a and b being 1 and c being 0 when Y is a metal selected from Group 2 and Group 12 of the periodic table, and a, b, and c are all 1 when Y is a metal selected from Group 13 of the periodic table; and the third element contains silica.

The polymers synthesized using the above-described catalyst composition contains silica dispersed at the molecular level. The polymers produced in that manner contain highly-dispersed silica, compared with the polymers produced by a conventional manner, and exhibit intended low heat generation property. Furthermore, compared with using polymers or silica composites produced by kneading, using the silica-containing polymers produced by the method according to the present invention enables the polymer composition to show better abrasion resistance.

Other preferred examples of the REE-containing compound include a complex represented by the following general formula (i) or (ii):

$$MX_2 \cdot Lw \quad (i)$$

$$MX_3 \cdot Lw \quad (ii)$$

wherein: M represents a lanthanoid element, scandium, or yttrium; X each independently represent a hydrogen atom, a halogen atom, an alkoxy group, a thiolate group, an amide group, a silyl group, an aldehyde residue, a ketone residue, a carboxylic acid residue, a thicarboxylic acid residue, a phosphorous compound residue, a substituted or unsubstituted cyclopentadienyl, or a substituted or unsubstituted indenyl; L represents a Lewis base; and w represents 0 to 3.

Preferably, the REE-containing compound or the reactant of the REE compound with the Lewis base does not have a bond between the rare earth element and the carbon. When the REE compound and the reactant of the REE compound with a Lewis base do not have the rare earth metal-carbon bond, the compound is stable and manageable.

Advantageous Effect of Invention

According to the method for producing the polymerization catalyst composition of the present invention, the polymer composition can be synthesized without using expensive compounds nor conducting a special process. Further according to the method for producing the polymerization catalyst composition of the present invention and the polymerization catalyst composition produced by the method, the polymers containing highly-dispersed silica can be obtained, so that kneading of silica with polymers, or a use of coupling agent or a compatibilizer can be omitted or minimized.

Still further according to the method for producing the polymer composition of the present invention, the polymer composition having an intended low heat generation property can be obtained. Further, the polymer composition of the present invention has an intended low heat generation property.

DESCRIPTION OF EMBODIMENTS

The following describes a method for producing a polymer composition of the present invention.

(Silica-Containing Polymer)

A silica-containing polymer contained in a polymer composition produced by a method for producing the polymer composition of the present invention has a polymer portion composed only of a conjugated diene compound or a polymer portion composed of a conjugated diene compound and an unconjugated diene olefin. In a word, the silica-containing polymer is a conjugated diene polymer or a copolymer composed of a conjugated diene compound and an unconjugated olefin, which are collectively referred to as a conjugated diene-based polymer.

The conjugated diene compound used as a monomer preferably has 4 to 8 carbon atoms. Specific examples of the conjugated diene compound include 1,3-butadiene, isoprene, 1,3-pentadiene, 2,3-dimethylbutadiene, and the like, with 1,3-butadiene and isoprene being preferred. These conjugated diene compounds can be used alone or in combination of two or more.

On the other hand, the unconjugated olefin used as a monomer is an olefin other than a conjugated diene compound, and is preferably a non-cyclic olefin. The unconjugated olefin preferably has 2 to 8 carbon atoms. The unconjugated olefin is thus preferably an α-olefin, such as ethylene, propylene, 1-butene, 1-pentene, 1-hexene, 1-heptene, 1-octene, and the like, with ethylene, propylene, and 1-butene being more preferred, and ethylene being most preferred. These unconjugated olefins can be used alone or in combination of two or more. The olefin is defined as an unsaturated aliphatic hydrocarbon, which is a compound containing at least one carbon-carbon double bond.

When the polymer is a copolymer, the copolymer is not limited to any particular type and may be any one of an alternating copolymer, a periodic copolymer, a random copolymer, a block copolymer, a graft copolymer, a tapered copolymer, or the like, with block copolymer and the tapered copolymer being preferred.

The number average molecular weight (Mn) of the polymer is not limited to any particular weight, and can be selected as appropriate depending on the application thereof. However, the weight is preferably 100,000 to 400,000, and more preferably 150,000 to 300,000. When the number average molecular weight (Mn) is 150,000 or more, a crosslinked polymer composition with improved durability (i.e., breaking resistance and abrasion resistance) can be obtained. When the number average molecular weight (Mn) is 300,000 or less, a decrease in processability is prevented. When the number average molecular weight (Mn) is within the above "more preferable" range, the polymer is further advantageous in both durability and process ability.

Here, the number average molecular weight (Mn) is obtained in terms of polystyrene, referencing polystyrene as a standard material, by using gel permeation chromatography (GPC) at a measurement temperature of 40° C.

Further, molecular weight distribution (Mw/Mn), represented by the ratio between the weight average molecular weight (Mw) and the number average molecular weight (Mn), is not particularly limited and may be selected as appropriate depending on the application thereof. Preferably, the molecular weight distribution is 4.0 or less and more preferably 3.0 or less. The molecular weight distribution (Mw/Mn) of 4.0 or less makes the physical property homogeneous. In the meantime, the molecular weight distribution (Mw/Mn) within the above "more preferable range" is also advantageous in terms of low heat generation property. Here, the molecular weight distribution (Mw/Mn) is calculated from a weight average molecular weight (Mw) and a number average molecular weight (Mn) obtained in terms of polystyrene, referencing polystyrene as a standard substance, by using gel permeation chromatography (GPC) at a measurement temperature of 40° C.

The gel fraction in the polymer is not particular limited and may be selected as appropriate depending on the application thereof. However, the gel fraction is preferably 40% or less, and more preferably 20% or less.

When the gel fraction in the polymer is 40% or less, a crosslinked rubber composition with improved durability (i.e., breaking resistance and abrasion resistance) can be obtained.

The polymer having 40% or less gel fraction in the polymer is obtained by, for example, performing a polymerization for a predetermined time (30 minutes to 2 days) at a low temperature (−50° C. to 100° C.) using a first, a second, or a third polymerization catalyst composition, which will be described later.

<Microstructure of Unit Derived from Conjugated Diene Compound>
—Cis-1,4 bond content—

The cis-1,4 bond content in the unit derived from the conjugated diene compound of the polymer is not limited to any particularly content and can be selected as appropriate depending on the application thereof. However, the content is preferably 90% or more, more preferably 95% or more, and most preferably 98% or more.

When the cis-1,4 bond content is 90% or more, the polymer develops sufficient strain-induced crystallinity.

When the cis-1,4 bond content is within the above "more preferable" or "most preferable" range, the polymer is further advantageous in terms of durability, which can be developed by the strain-induced crystallinity.

—Trans-1,4 bond content—

The trans-1,4 bond content in the unit derived from the conjugated diene compound of the polymer is not limited to any particularly content and can be selected as appropriate depending on the application thereof. However, the content is preferably 10% or less, and more preferably 5% or less.

When the trans-1,4 bond content is 10% or less, the polymer develops sufficient strain-induced crystallinity.

When the trans-1,4 bond content is within the above "more preferable" range, the polymer is further advantageous in terms of durability, which can be developed by the strain-induced crystallinity.

—3,4-venyl bond content—

The 3,4-vinyl content in the unit derived from the conjugated diene compound of the polymer is not limited to any particularly content and can be selected as appropriate depending on the application thereof. However, the content is preferably 5% or less, and more preferably 2% or less.

When the 3,4-vinyl content is 5% or less, the polymer develops sufficient strain-induced crystallinity.

When the 3,4-vinyl bond content is within the above "more preferable" range, the polymer is further advantageous in terms of durability, which can be developed by the strain-induced crystallinity.

(Method for Producing Conjugated Diene-Based Polymer)

Now, a method for producing the conjugated diene-based polymer will be described in detail. However, the producing method described in detail below is merely an example. The conjugated diene-based polymer is produced by polymerizing the conjugated diene compound and/or unconjugated olefin in the presence of a polymerization catalyst composition.

<Polymerization Catalyst Composition>

The polymerization catalyst composition used in the method for producing the conjugated diene-based polymer is obtained by combining a first element, a second element, and a third element, which will be described below.

<<First Element>>

The first element included in the polymerization catalyst composition of the present invention contains a compound that contains a rare earth element (REE-containing compound). The first element preferably contains a rare earth element compound (REE compound) or a reactant of the REE compound with a Lewis base as the REE-containing compound. In this regard, the REE compound and the reactant of the REE compound with a Lewis base preferably do not have a bond between the rare earth element and the carbon. When the REE compound and the reactant of the REE compound with a Lewis base do not have the rare earth element-carbon bond, the compound is stable and manageable. The REE compound herein is a compound that contains a lanthanoid element, scandium, or yttrium. The lanthanoid elements include elements with atomic numbers 57 to 71 of the periodic table. Specific examples of the lanthanoid element include lanthanum, cerium, praseodymium, neodymium, promethium, samarium, europium, gadolinium, terbium, dysprosium, holmium, erbium, thulium, ytterbium, and lutetium. The first element can be used alone or in combination of two or more.

The REE-containing compound may preferably be the following compound.

<<<REE-Containing Compound>>>

The REE-containing compound can be the compound having the following structure. The REE-containing compound is preferably composed of a rare earth metal of a bivalent or trivalent salt or of a complex compound, and is further preferably a REE-containing compound that contains at least one or two ligands selected from a hydrogen atom, a halogen atom, and an organic compound residue. Further, the REE compound or the reactant of the REE compound with the Lewis base preferably contains a complex represented by the following general formula (i) or (ii):

$$MX_2 \cdot Lw \qquad (i)$$

$$MX_3 \cdot Lw \qquad (ii)$$

wherein: M represents a lanthanoid element, scandium, or yttrium; X each independently represent a hydrogen atom, a halogen atom, an alkoxy group, a thiolate group, an amide group, a silyl group, an aldehyde residue, a ketone residue, a carboxylic acid residue, a thicarboxylic acid residue, a phosphorous compound residue, a substituted or unsubstituted cyclopentadienyl, or a substituted or unsubstituted indenyl; L represents a Lewis base; and w represents 0 to 3.

Specific examples of a group (ligand) to form a bond to the rare earth element of the REE-containing compound include: a hydrogen atom; aliphatic alkoxy groups such as a methoxy group, an ethoxy group, a propoxy group, an n-butoxy group, an isobutoxy group, a sec-butoxy group, and a tert-butoxy group; aromatic alkoxy groups such as a phenoxy group, a 2,6-di-tert-butylphenoxy group, a 2,6-diisopropylphenoxy group, a 2,6-dineopentylphenoxy group, a 2-tert-butyl-6-isopropylphenoxy group, a 2-tert-butyl-6-neopentylphenoxy group, and a 2-isopropyl-6-neopentylphenoxy group; aliphatic thiolate groups such as thiomethoxy group, a thioethoxy group, a thiopropoxy group, a thio-n-butoxy group, a thioisobutoxy group, a thio-sec-butoxy group, and a thio-tert-butoxy group; aryl thiolate groups such as a thiophenoxy group, a 2,6-di-tert-butylthiophenoxy group, a 2,6-diisopropylthiophenoxy group, a 2,6-dineopentylthiophenoxy group, a 2-tert-butyl-6-isopropylthiophenoxy group, a 2-tert-butyl-6-thioneopentylphenoxy group, a 2-isopropyl-6-thioneopentylphenoxy group, and a 2,4,6-triisopropylthiophenoxy group; aliphatic amide groups such as a dimethyl amide group, a diethyl amide group, a diisopropyl amide group; arylamide groups such as a phenyl amide group, a 2,6-di-tert-butylphenyl amide group, a 2,6-diisopropylphenyl amide group, a 2,6-dineopentylphenyl amide group, a 2-tert-butyl-6-isopropylphenyl amide group, a 2-tert-butyl-6-neopentylphenyl amide group, a 2-isopropyl-6-neopentylphenyl amide group, and a 2,4,6-tert-butylphenyl amide group; bis-trialkylsilyl amide groups such as a bistrimethylsilyl amide group; silyl groups such as a trimethylsilyl group, a tris(trimethylsilyl)silyl group, a bis(trimethylsilyl)methylsilyl group, a trimethylsilyl(dimethyl)silyl group, and a triisopropylsilyl(bistrimethylsilyl)silyl group; halogen atoms such as a fluorine atom, a chlorine atom, a bromine atom, and an iodine atom. Other examples may include: residues of aldehyde such as salicylaldehyde, 2-hydroxy-1-naphthaldehyde, and 2-hydroxy-3-naphthaldehyde; residues of hydroxyphenone such as 2'-hydroxyacetophenone, 2'-hydroxybutyrophenone, and 2'-hydroxypropiophenone; residues of diketone such as acetylacetone, benzoylacetone, propionylaceton, isobutyl acetone, valerylacetone, and ethylacetylacetone; residues of an carboxylic acid such as an isovaleric acid, a caprylic acid, an octanoic acid, a lauric acid, a myristic acid, a palmitic acid, a stearic acid, an isostearic acid, an oleic acid, a linoleic acid, a cyclopentanecarboxylic acid, a naphthenic acid, an ethylhexanoic acid, a pivalic acid, a versatic acid (trade name of a product manufactured by Shell Chemicals Japan Ltd., a synthetic acid composed of a mixture of C10 monocarboxylic acid isomers), a phenylacetic acid, a benzoic acid, 2-naphthoate acid, a maleic acid, and a succinic acid; residues of thicarboxylic acid such as a hexanethioic acid, 2,2-dimethylbutanethioic acid, a decanethioic acid, and a thiobenzoic acid; residues of phosphoric acid ester such as a phosphoric acid dibutyl, a phosphoric acid dipentyl, a phosphoric acid dihexyl, a phosphoric acid diheptyl, a phosphoric acid dioctyl, phosphoric acid bis(2-ethylhexyl), a phosphoric acid bis(1-methylheptyl), a phosphoric acid dilauryl, a phosphoric acid dioleyl, a phosphoric acid diphenyl, a phosphoric acid bis(p-nonylphenyl), a phosphoric acid bis(polyethylene glycol-p-nonylphenyl), a phosphoric acid (butyl)(2-ethylhexyl), a phosphoric acid(1-methylheptyl)(2-ethylhexyl), and a phosphoric acid(2-ethylhexyl)(p-nonylphenyl); residues of phosphonic acid ester such as a 2-ethylhexyl phosphonic acid monobutyl, a 2-ethylhexyl phosphonic acid mono-2-ethylhexyl, a phenylphosphonic acid mono-2-ethylhexyl, a 2-ethylhexyl phosphonic acid mono-p-nonylphenyl, a phosphonic acid mono-2-ethylhexyl, a phosphonic acid mono-1-methylheptyl, a and phosphonic acid mono-p-nonylphenyl; residues of phosphinic acid such as a dibutylphosphinic acid, a bis(2-ethylhexyl)phosphinic acid, a bis(1-methylheptyl)phosphinic acid, a dilauryl phosphinic acid, a dioleyl phosphinic acid, a diphenyl phosphinic acid, a bis(p-nonylphenyl)phosphinic acid, a butyl(2-ethylhexyl)phosphinic acid, (2-ethylhexyl)(2-methylhexyl)(1-methylheptyl)phosphinic acid, an (2-ethylhexyl)(p-nonylphenyl)phosphinic acid, a butyl phosphinic acid, 2-ethylhexyl phosphinic acid, a 1-methylheptyl phosphinic acid, an oleyl phosphinic acid, a lauryl phosphinic acid, a phenyl phosphinic acid, and a p-nonylphenyl phosphinic acid. These ligands may be used alone or in combination of two or more.

As to the first element, examples of the Lewis base to react with the REE compound may include: tetrahydrofuran, diethyl ether, dimethylaniline, trimethylphosphine, lithium chloride, neutral olefins, and neutral diolefins. Here, in the case where the REE compound reacts with a plurality of Lewis bases (in the case where w is 2 or 3 in Formulae (i) and (ii)), the Lewis base L in each Formula may be the same as or different from each other.

<<<Preferred REE-Containing Compound>>>

One example of the REE-containing compound contains at least one complex selected from the group consisting of: a metallocene complex represented by the general formulae (I), and a metallocene complex represented by the following general formula (II).

[Formula 1]

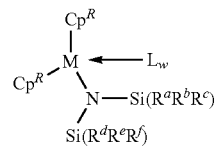

(I)

In the Formula (I), M represents a lanthanoid element, scandium, or yttrium; $Cp^R$ each independently represents a unsubstituted or substituted indenyl, $R^a$ to $R^f$ each independently represents a hydrogen atom or alkyl group having 1 to 3 carbon atoms; L represents a neutral Lewis base; and w represents an integer of 0 to 3.

[Formula 2]

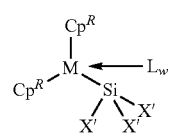

(II)

In the Formula (II), M represents a lanthanoid element, scandium, or yttrium; $Cp^R$ each independently represents an unsubstituted or substituted indenyl; X' represents a hydrogen atom, a halogen atom, an alkoxide group, a thiolate group, an amide group, a silyl group, or a hydrocarbon group having 1 to 20 carbon atoms; L represents a neutral Lewis base; and w represents an integer of 0 to 3.

Here, the metallocene complex is a complex compound having at least one or more cyclopentadienyl groups or derivative of cyclopentadienyl groups bonded to the central metal. In particular, a metallocene complex may be referred to as half metallocene complex when the number of cyclopentadienyl group or derivative thereof bonded to the central metal is one.

In the polymerization system, the concentration of the complex contained in the polymerization catalyst composition is preferably in a range of 0.1 to 0.0001 mol/L.

In the metallocene complex represented by the general formulae (I) and (II) above, $Cp^R$ in the formulae represents an unsubstituted or substituted indenyl group. $Cp^R$ having an indenyl ring as a basic skeleton may be represented by $C_9H_{7-X}R_X$ or $C_9H_{11-X}R_X$. Here, X represents an integer of 0 to 7 or 0 to 11. R each independently preferably represents a hydrocarbyl group or a metalloid group. The hydrocarbyl group preferably has 1 to 20 carbon atoms, more preferably 1 to 10 carbon atoms, and still more preferably 1 to 8 carbon atoms. Preferred specific examples of the hydrocarbyl group include a methyl group, an ethyl group, a phenyl group, and a benzyl group. Examples of metalloid in the metalloid group include germyl (Ge), stannyl (Sn), and silyl (Si). The metalloid group preferably has a hydrocarbyl group, and examples of such a hydrocarbyl group are similar to those listed above. Specific example of the metalloid group includes a trimethylsilyl group. Specific examples of the substituted indenyl group include 2-phenyl indenyl and 2-methyl indenyl group. Two $Cp^R$'s in each of the general formulae (I) and (II) may be the same as or different from each other.

The central metal represented by M in the general formulae (I) and (II) represents a lanthanoid element, scandium, or yttrium. The lanthanoid elements include 15 elements with atomic numbers 57 to 71, and may be any one of them. Preferred examples of the central metal represented by M include samarium (Sm), neodymium (Nd), praseodymium (Pr), gadolinium (Gd), cerium (Ce), holmium (Ho), scandium (Sc), and yttrium (Y).

The metallocene complex represented by the general formula (I) includes a silyl amide ligand represented by [—N(SiR_3)_2]. Groups represented by $R(R^a$ to $R^f$ in the general formula (I)) in the silyl amide ligand each independently represent a hydrogen atom or an alkyl group having 1 to 3 carbon atoms. It is preferred that at least one of $R^a$ to $R^f$ represents a hydrogen atom. With at least one of $R^a$ to $R^f$ being a hydrogen atom, the catalyst can be synthesized with ease, and the height around silicon can be reduced, thereby allowing the unconjugated olefin to be easily introduced. For the same reason, at least one of $R^a$ to $R^c$ is preferably a hydrogen atom, and it is further preferred that at least one of $R^d$ to $R^f$ is a hydrogen atom. Further, the alkyl group is preferably a methyl group.

The metallocene complex represented by the general formula (II) includes a silyl ligand represented by [—SiX'_3]. X' in the silyl ligand represented by [—SiX'_3] is a group selected from the group consisting of a hydrogen atom, a halogen atom, an alkoxide group, a thiolate group, an amide group, a silyl group, and a hydrocarbon group having 1 to 20 carbon atoms. Here, the alkoxy group may be any one of: aliphatic alkoxy groups, such as a methoxy group, an ethoxy group, a propoxy group, an n-butoxy group, an isobutoxy group, a sec-butoxy group, and a tert-butoxy group; and aryl oxide groups, such as a phenoxy group, a 2,6-di-tert-butylphenoxy group, a 2,6-diisopropylphenoxy group, a 2,6-dineopen-tylphenoxy group, a 2-tert-butyl-6-isopropylphenoxy group, a 2-tert-butyl-6-neopentylphenoxy group, and a 2-isopropyl-6-neopentylphenoxy group, with the 2,6-di-tert-butylphenoxy group being preferred.

The metallocene complexes represented by the general formulae (I) and (II) further include 0 to 3, preferably 0 or 1 neutral Lewis bases represented by L. Examples of the neutral Lewis base L include tetrahydrofuran, diethyl ether, dimethylaniline, trimethylphosphine, lithium chloride, neutral olefins, and neutral diolefins. When the complex contains multiple neutral Lewis bases represented by L, the bases L may be the same as or different from each other.

The metallocene complexes represented by the general formulae (I) and (II) may be contained as monomers, or as dimers or multimers having two or more monomers.

The metallocene complex represented by the general formula (I) can be obtained by, for example, subjecting a lanthanoid trishalide, a scandium trishalide, or a yttrium trishalide to reaction in a solvent with a salt of indenyl (for example, a potassium salt or a lithium salt) and a salt of bis(trialkylsilyl) amide (for example, a potassium salt or a lithium salt). The reaction may be carried out at temperatures around room temperature, and thus the metallocene complex can be produced under mild conditions. The reaction time is arbitrary, but about several hours to several tens of hours. The reaction solvent is not particularly limited, and any solvent including, for example toluene, which is capable of dissolving the raw material and the product, can be preferably used. In the following, a reaction example for obtaining the metallocene complex represented by the general formula (I) is described.

[Formula 3]

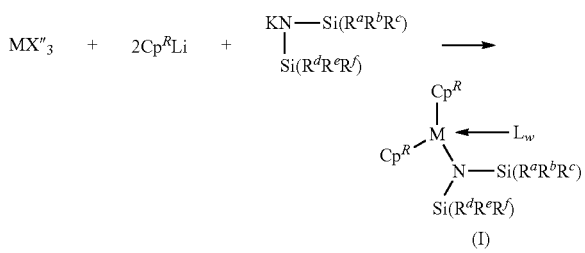

In the above formula, X" represents a halide.

The metallocene complex represented by the general formula (II) can be obtained by, for example, subjecting a lanthanoid trishalide, a scandium trishalide, or a yttrium trishalide to reaction in a solvent with a salt of indenyl (for example, a potassium salt or a lithium salt) and a salt of silyl (for example, a potassium salt or a lithium salt). The reaction may be carried out at temperatures around room temperature, and thus the metallocene complex can be produced under mild conditions. The reaction time is arbitrary, but about several hours to several tens of hours. The reaction solvent is not particularly limited, and any solvent including, for example toluene, which is capable of dissolving the raw material and the product, can be preferably used. In the following, a reaction example for obtaining the metallocene complex represented by the general formula (II) is described.

[Formula 4]

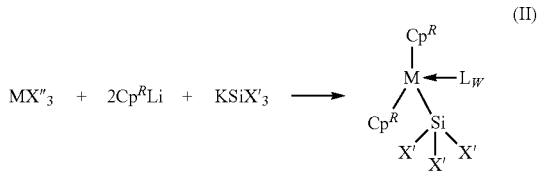

In the above formula, X" represents a halide.

Structures of the metallocene complex represented by the general formula (I) and (II) are preferably determined by X-ray crystallography.

<<<Other Preferred REE-Containing Compounds>>>

One example of the above-mentioned other REE-containing compounds may be a metallocene compound represented by the following general formula (A):

wherein: R each independently represents an unsubstituted or substituted indenyl group, the R being coordinated with M; M represent a lanthanoid element, scandium, or yttrium; X each independently represents hydrocarbon group having 1 to 20 carbon atoms, the X being μ-coordinated with M and Q; Q represents a Group 13 element in the periodic table; Y each independently represents a hydrocarbon group having 1 to 20 carbon atoms or a hydrogen atom, the Y being coordinated with Q; and a and b each are 2.

The metallocene compound represented by the general formula (A) is referred to as a third REE-containing compound.

One preferred example of the above-described metallocene compound is a compound represented by the following formula (XV):

[Formula 5]

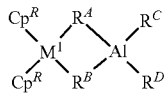

(XV)

wherein: $M^1$ represents a lanthanoid element, scandium or yttrium; $Cp^R$ each independently represents a unsubstituted or substituted indenyl group; $R^A$ and $R^B$ each independently represent a hydrocarbon group having 1 to 20 carbon atoms, the $R^A$ and $R^B$ each being μ-coordinated with $M^1$ and Al; and $R^C$ and $R^D$ each independently represent a hydrocarbon group having 1 to 20 carbon atoms or a hydrogen atom.

In the following, the metallocene compound will be described in detail. The use of the metallocene compound represented by the above general formula (A) as a catalyst, which is prepared, for example, by being combined with an aluminum catalyst in advance, can reduce or eliminate the amount of alkyl aluminum to be used to synthesize a copolymer. The use of a conventional catalyst system requires a large amount of alkyl aluminum to be used in synthesizing a copolymer. For example, a conventional catalyst system requires alkyl aluminum of at least 10 equivalents relative to a metal catalyst, whereas the metallocene-based composite catalyst of the present invention requires only about 5 equivalents to demonstrate significant catalytic effects.

In the metallocene compound, the metal represented by M in the formula (A) is a lanthanoid element, scandium, or yttrium. The lanthanoid elements include 15 elements with atomic numbers 57 to 71, and may be any one of them. Preferred examples of metal represented by M include samarium (Sm), neodymium (Nd), praseodymium (Pr), gadolinium (Gd), cerium (Ce), holmium (Ho), scandium (Sc), and yttrium (Y).

In the formula (A), R each independently represents an unsubstituted or substituted indenyl, the R being coordinated with the metal M. Specific examples of the substituted indenyl group include a 1,2,3-trimethyl indenyl group, a heptamethyl indenyl group, and a 1,2,4,5,6,7-hexamethyl indenyl group.

In the formula (A), Q represents a Group 13 element in the periodic table. Specific examples thereof include boron, aluminum, gallium, indium, and thallium.

In the formula (A), X each independently represents a hydrocarbon group having 1 to 20 carbon atoms, the X being μ-coordinated with M and Q. Here, examples of the hydrocarbon group having 1 to 20 carbon atoms include: a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, and a stearyl group. The μ-coordination refers to a state of coordination which forms a crosslinked structure.

In the formula (A), Y each independently represents a hydrocarbon group having 1 to 20 carbon atoms or a hydrogen atom, and the Y is coordinated with Q. Here, examples of the hydrocarbon group having 1 to 20 carbon atoms include: a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, and a stearyl group.

In the formula (XV) above, the metal represented by $M^1$ is a lanthanoid element, scandium, or yttrium. The lanthanoid elements include 15 elements with atomic numbers 57 to 71, and may be any one of them. Preferred examples of the metal represented by $M^1$ include samarium (Sm), neodymium (Nd), praseodymium (Pr), gadolinium (Gd), cerium (Ce), holmium (Ho), scandium (Sc), and yttrium (Y).

In the formula (XV), $Cp^R$ represents an unsubstituted or substituted indenyl. $Cp^R$ having an indenyl ring as a basic skeleton may be represented by $C_9H_{7-X}R_X$ or $C_9H_{11-X}R_X$. Here, X represents an integer of 0 to 7 or 0 to 11. R each independently preferably represents a hydrocarbyl group or a metalloid group. The hydrocarbyl group preferably has 1 to 20 carbon atoms, more preferably 1 to 10 carbon atoms, and still more preferably 1 to 8 carbon atoms. Preferred specific examples of the hydrocarbyl group include a methyl group, an ethyl group, a phenyl group, and a benzyl group. Examples of metalloid in the metalloid group include germyl (Ge), stannyl (Sn), and silyl (Si). The metalloid group preferably has a hydrocarbyl group, and examples of such a hydrocarbyl group are similar to those listed above. Specific example of the metalloid group includes a trimethylsilyl group. Specific examples of the substituted indenyl group include 2-phenyl indenyl and 2-methyl indenyl group. Two CpR's in the general formula (XV) may be the same as or different from each other.

In the formula (XV), $R^A$ and $R^B$ each independently represent a hydrocarbon group having 1 to 20 carbon atoms, and the $R^A$ and $R^B$ being μ-coordinated with $M^1$ and $A^1$. Here, examples of the hydrocarbon group having 1 to 20 carbon atoms include: a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, and a stearyl group. The μ-coordination refers to a state of coordination which forms a crosslinked structure.

In the formula (XV), $R^C$ and $R^D$ each independently represent a hydrocarbon group having 1 to 20 carbon atoms or a hydrogen atom. Here, examples of the hydrocarbon group having 1 to 20 carbon atoms include: a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, and a stearyl group.

The metallocene compound represented by the above formula (XV) can be obtained by, for example, reacting a metallocene complex with an organic aluminum compound represented by $AlR^K R^L R^M$ in a solvent. The metallocene complex is represented by the following formula (XVI):

[Formula 6]

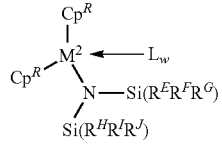

(XVI)

wherein $M^2$ represents a lanthanoid element, scandium, or yttrium; $Cp^R$ each independently represents an unsubstituted or substituted indenyl group; $R^E$ to $R^J$ each independently represent an alkyl group having 1 to 3 carbon atoms or a hydrogen atom; L represents a neutral Lewis base; and w represents an integer of 0 to 3.

The reaction may be carried out at temperatures around room temperature, and thus the metallocene compound can be produced under mild conditions. The reaction time is arbitrary, but about several hours to several tens of hours. The reaction solvent is not particularly limited, but is preferably a solvent that is capable of dissolving the raw material and the product. Toluene and hexane may for example be used. The structure of the metallocene compound may preferably be determined by $^1$H-NMR or X-ray crystallography.

In the metallocene complex represented by the formula (XVI), $Cp^R$ is an unsubstituted indenyl or substituted indenyl, and is equivalent to $Cp^R$ in the formula (XV). Further, in the formula (XVI), the metal $M^2$ represents a lanthanoid element, scandium, or yttrium, which is equivalent to the metal $M^1$ in the formula (XV).

The metallocene complex represented by the formula (XVI) includes a silyl amide ligand represented by [—N(SiR$_3$)$_2$]. Groups represented by R(R$^E$ to R$^J$) in the silyl amide ligand each independently represent a hydrogen atom or an alkyl group having 1 to 3 carbon atoms. It is preferred that at least one of $R^E$ to $R^J$ represents a hydrogen atom. With at least one of $R^E$ to $R^J$ representing a hydrogen atom, the catalyst can be synthesized with ease. Further, the alkyl group is preferably a methyl group.

The metallocene complex represented by the above formula (XVI) further contains 0 to 3, preferably 0 or 1 neutral Lewis bases represented by L. Examples of the neutral Lewis base L include tetrahydrofuran, diethyl ether, dimethylaniline, trimethylphosphine, lithium chloride, neutral olefins, and neutral diolefins. When the complex contains multiple neutral Lewis bases represented by L, the bases L may be the same as or different from each other.

The metallocene complex represented by the formula (XVI) may be contained as monomers, or as dimers or multimers having two or more monomers.

The organic aluminum compound to be used for generating the metallocene compound is represented by a general formula $AlR^K R^L R^M$, where $R^K$ and $R^L$ each independently represent a univalent hydrocarbon group having 1 to 20 carbon atoms or a hydrogen atom and $R^M$ represents a univalent hydrocarbon group having 1 to 20 carbon atoms, with the $R^M$ being either the same as or different from $R^K$ or $R^L$. Examples of the univalent hydrocarbon groups having 1 to 20 carbon atoms include a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, and a stearyl group.

Specific examples of the organic aluminum compound include: a trimethyl aluminum, a triethyl aluminum, a tri-n-propyl aluminum, a triisopropyl aluminum, a tri-n-butyl aluminum, a triisobutyl aluminum, a tri-t-butyl aluminum, a tripentyl aluminum, a trihexyl aluminum, a tricyclohexyl aluminum, a trioctyl aluminum; a diethylaluminum hydride, a di-n-propyl aluminum hydride, a di-n-butyl aluminum hydride, a diisobutyl aluminum hydride, a dihexyl aluminum hydride; a diisohexyl aluminum hydride, a dioctyl aluminum hydride, a diisooctyl aluminum hydride; an ethyl aluminum dihydride, a n-propyl aluminum dihydride, and an isobutyl aluminum dihydride, with the triethyl aluminum, the triisobutyl aluminum, the diethyl aluminum hydride, and the diisobutyl aluminum hydride being preferred. These organic aluminum compounds may be contained alone or in combination of two or more. The amount of the organic aluminum compound to be used for generating the metallocene compound is preferably 1-fold mol to 50-fold mol, and more preferably about 10-fold mol, relative to the metallocene complex.

<<Second Element>>

The second element included in the polymerization catalyst composition of the present invention contains an organic metal compound represented by the following general formula (X):

$$YR^1_a R^2_b R^3_c \qquad (X)$$

wherein Y is a metal selected from Group 1, Group 2, Group 12, and Group 13 of the periodic table; $R^1$ and $R^2$ are the same or different hydrocarbon groups each having 1 to 10 carbon atoms or a hydrogen atom; and $R^3$ is a hydrocarbon group having 1 to 10 carbon atoms, $R^1$, $R^2$, and $R^3$ may be the same as or different from each other, with a being 1 and b and c both being 0 when Y is a metal selected from Group 1 of the periodic table, a and b being 1 and c being 0 when Y is a metal selected from Group 2 and Group 12 of the periodic table, and a, b, and c are all 1 when Y is a metal selected from Group 13 of the periodic table.

In addition, the second element is preferably an organic aluminum compound represented by the following general formula (Xa):

$$AlR^1 R^2 R^3 \qquad (Xa)$$

wherein $R^1$ and $R^2$ are hydrogen atoms or hydrocarbon groups each having 1 to 10 carbon atoms; and $R^3$ is a hydrocarbon group having 1 to 10 carbon atoms, in which $R^1$, $R^2$, and $R^3$ may be the same as or different from each other.

Examples of the organic aluminum compound represented by the general formula (Xa) include: a trimethyl aluminum, a triethyl aluminum, a tri-n-propyl aluminum, a triisopropyl aluminum, a tri-n-butyl aluminum, a triisobutyl aluminum, a tri-t-butyl aluminum, a tripentyl aluminum, a trihexyl aluminum, a tricyclohexyl aluminum, a trioctyl aluminum; a diethylaluminum hydride, a di-n-propyl aluminum hydride, a di-n-butyl aluminum hydride, a diisobutyl aluminum hydride, a dihexyl aluminum hydride; a diisohexyl aluminum hydride, a dioctyl aluminum hydride, a diisooctyl aluminum hydride; an ethyl aluminum dihydride, a n-propyl aluminum dihydride, and an isobutyl aluminum dihydride, with the triethyl aluminum, the triisobutyl aluminum, the diethyl aluminum hydride, and the diisobutyl aluminum hydride being preferred. The above-mentioned organic aluminum compounds as the second element may be contained alone or in combination of two or more. The content of the second element in the polymerization catalyst composition is preferably 1-fold mol to 50-fold mol, and more preferably about 10-fold mol, with respect to the first element.

<<Third Element>>

The third element included in the polymerization catalyst composition of the present invention contains silica. Specifically, the term "silica" as used herein not only narrowly refers to silicon dioxide (represented as $SiO_2$ in general formula) but also includes silicic acid-based fillers, which specifically include silicates, such as hydrous silicates, calcium silicates, aluminum silicates, other than silicic anhydride. The aggregation state of the silica is also unlimited. Silica with any aggregation state, such as recipitated, gel-type, dry, colloidal, can be used. Furthermore, the producing method of the silica is also unlimited. Both wet silica and dry silica can be thus used. Wet silica with high abrasion resistance is particularly preferred. BET of silica is not limited to any particular value, and thus silica having the BET within a range of 10 to 1000 $m^2/g$ can be for example used. One example of such silica is "Nipsil AQ" with BET 205 $m^2/g$, manufactured by Tosoh Silica Corporation.

Silica used in NPL 1 as a catalyst composition is dehydrated through calcination. However, silica used in the present invention need not be calcined.

The amount of the third element contained in the polymerization catalyst composition is preferably more than 0 weight parts and less than or equal to 100 weight parts per 100 weight parts of monomer constituting the silica-containing polymer, which is added afterward. More preferably, the amount of the third element is 2 to 80 weight parts, and most preferably 5 to 60 weight parts. The third element contained by the above-mentioned range effectively functions as a catalyst and efficiently disperse silica in the polymer.

<<Preparation of Polymerization Catalyst Composition>>

The polymerization catalyst composition of the present invention is prepared by mixing and aging the second and third elements, and then adding the first element to the mixture to react the first element with the mixture. The term "mixing and aging" as used herein refers to mixing and reacting the second element with the third element. The aging time and temperature are not particularly limited, but are preferably 5 seconds to 10 hours and $-100°$ C. to $100°$ C., respectively.

First, by mixing and aging the second and third elements in a solvent, the second element is reacted with the water content of the third element to form a complex having negative charge (i.e., anion complex). This reaction is supported by the fact that the reacting, for example, alkyl aluminum with water generates methylaluminoxane, which is explained in detail by S. Pasynkiewicz (*Polyhedron* (1990), vol. 9, pp. 429-453). The reaction is assumed to result in the presence of the anion complex, which contains the second element, near the silica of the third element, in a manner such that the anion complex forms a coating on the silica.

The first element or specifically the REE-containing compound is then added to the mixture of the second and the third elements under this condition and is reacted with the mixture. This generates in the reaction system a REE cation compound derived from the first element, the second element, and a silica-containing anion complex derived from the reaction of the second and the third elements.

The rare earth element of the first element or the REE-containing compound according to the present invention normally has three ligands coordinated therewith. However, depending on conditions, the rare earth element may turn into a cation by releasing one or more ligands in the presence of anions. The first element is accordingly likely to turn into a cation by being reacted with the anion complex, which is formed by reacting the second element with third element, and then the anion complex is likely to be bonded with the generated cation.

In this regard, it has been demonstrated that when a catalyst composition, which contains a REE cation compound, has a metal, such as aluminum (represented as Y herein), disposed next to the rare earth element, the active center of the catalyst moves from the rare earth element to the adjacent metal element (Y) side. Refer to Y. Matsuura et al., "*Polymerization via the Insertion of Ethylene into an Al—C Bond Catalyzed by Lanthanide (Gd, Sm) Metallocene Cations*" 58th Symposium on Organomethallic Chemistry, Japan, Abstracts, The Kinki Chemical Society, Japan, 2011. For a polymerization catalyst composition, the active center of the polymerization reaction moves to the adjacent metal element (Y), where the targeted polymer is generated.

For the polymerization catalyst composition of the present invention, the rare earth element disposed next to the metal element (Y), which exists on the silica particle in the form of coating, can allow the active center to move to the silica particles. This results in the polymerization reaction that occurs at the metal element (Y) on the silica particles, generating polymers very close to the silica. Some of the polymers may even be included in the porous of the silica to integrate with the silica particles.

As above, the polymerization catalyst composition of the present invention contains the metal element (Y) derived from the second element, the silica derived from the third element, and the polymers that are closely disposed or integrated, which enables the silica to be highly dispersed in the generated polymers.

To increase the efficiency of the polymerization reaction of a polymerization catalyst composition containing a REE compound, the amount of the REE compound in the composition is normally increased. However, REE compounds are difficult to use in large amounts since they are expensive. In contrast, when the polymerization catalyst composition of the present invention is used, the efficiency of the polymerization reaction depends not on the amount of the REE compound in the composition but on the amount of silica and the metal element (Y) in the composition. The amount of these elements in the composition can be increased at relatively low producing cost.

The first element is likely to be deactivated in the presence of water, but is unlikely to be deactivated when placed with the anion complex. Thus, the silica used as the third element need not be dehydrided through calcination or the like. The present invention, which can omit the process of calcination or the like, can be implemented with lower producing cost while achieving higher producing efficiency. Rather than being dehydrated, the third element preferably contains at least a certain amount of water to accelerate the polymerization reaction. The water content is preferably more than 0 wt % and less than or equal to 50 wt %, more preferably 0.1 to 20 wt %, and most preferably 0.5 to 10 wt %.

<<Production of Conjugated Diene-Based Polymer>>

The polymers that can be synthesized by using the catalyst composition of the present invention is not particularly limited. The catalyst composition can be used in synthesizing any polymers that require addition of silica. The catalyst composition is preferably used in synthesizing polybutadiene and polyisoprene.

<<Production of Polybutadiene>>

The polymerization catalyst composition of the present invention can be used in producing various polymers, however, the present specification exemplary illustrates synthesis of polybutadiene, which uses the polymerization catalyst composition of the present invention. The producing method described in detail below is merely an example. The polybutadiene can be produced by polymerizing 1,3-butadiene monomers in the presence of the polymerization catalyst composition.

The production of the polybutadiene using the polymerization catalyst composition of the present invention at least includes a polymerization step, and further includes coupling, cleaning, and other steps arbitrarily selected as necessary.

<<<Polymerization>>>

The polymerization is a step for polymerizing butadiene monomers.

In the polymerization, 1,3-butadiene monomers can be polymerized in a manner similar to that conventionally used in producing polymers using a coordination ion polymerization catalyst, except that the polymerization catalyst composition according to the present invention is used.

An arbitrary method can be employed as the polymerization method including, for example, solution polymerization, suspension polymerization, liquid phase bulk polymerization, emulsion polymerization, vapor phase polymerization, and solid state polymerization. In the case of using a solvent for polymerization reaction, any solvent may be used that is inert to the polymerization reaction, including, for example, toluene, cyclohexane, n-hexane and mixtures thereof.

The polymerization can be carried out in either one of the following manners. That is, for example, (1) the components forming the polymerization catalyst composition may be provided in the polymerization reaction system containing 1,3-butadiene monomers separately, to thereby prepare the polymerization catalyst composition in the reaction system, or (2) the polymerization catalyst composition prepared in advance may be provided into the polymerization reaction system.

Further, in the polymerization, a terminator such as methanol, ethanol, and isopropanol may be used to stop the polymerization.

In the polymerization, the polymerization reaction of the 1,3-butadiene may preferably be performed in an inert gas atmosphere, and preferably in nitrogen or argon atmosphere. The polymerization temperature of the polymerization reaction is not particularly limited, but is preferably in a range of, for example, −100° C. to 200° C., and may also be temperatures around room temperature. An increase in the polymerization temperature may reduce the cis-1,4-selectivity in the polymerization reaction. The polymerization reaction is preferably performed under pressure in a range of 0.1 to 10.0 MPa so as to allow the 1,3-butadiene to be sufficiently introduced into polymerization system. Further, the reaction time of the polymerization is not particularly limited, but may preferably be in a range of, for example, 1 second to 10 days, which may be selected as appropriate depending on the conditions such as the type of catalyst, and polymerization temperature.

<<<Cleaning>>>

The cleaning is a step for cleaning the silica-containing polymer obtained in the polymerization. The medium used in the cleaning is not particularly limited and may be selected as appropriate depending on the application thereof. Examples of the medium include methanol, ethanol, and isopropanol. When a catalyst derived from a Lewis acid is used as the polymerization catalyst, an acid (e.g., hydrochloric acid, sulfuric acid, and nitric acid) may be added to the solvent. The amount of acid that may be added is preferably 15 mol % or less relative to the solvent. An acid added by the amount exceeding 15 mol % can remain in the polymer, potentially causing adverse effects on the reaction during kneading and vulcanization.

This cleaning step suitably decreases the amount of catalyst residue remaining in the silica-containing polymer.

(Polymer Composition)

The polymer composition of the present invention contains at least the above-described polymer component, and further contains other polymer components, fillers, crosslinking agents, and other components as necessary.

<Polymer>

The polymer contains at least one of the above-described conjugated diene-based polymers containing silica, and further contains other polymers as necessary. The above-mentioned other polymers are not particularly limited and may be selected as appropriate depending on the application thereof. Examples of the polymers include rubber components such as butadiene rubber (BR), styrene butadiene rubber (SBR), acrylonitrile-butadiene rubber (NBR), chloroprene rubber, ethylene-propylene rubber (EPM), ethylene-propylene unconjugated-diene rubber (EPDM), polysulfide rubber, silicone rubber, fluoro-rubber, and urethane rubber. These rubber components may be used alone or in combination of two or more.

<Filler>

The filler is not particularly limited, except for the silica contained in the polymerization catalyst composition, and may be selected as appropriate depending on the application thereof. Examples of the filler include a carbon black and an inorganic filler. The polymer composition preferably contains at least one selected from the carbon black and the inorganic filler. More preferably, the polymer composition contains the carbon black. The filler is added to the polymer composition to reinforce the polymer composition.

The amount (content) of the filler added after the polymerization composition to the resultant is not particularly limited and may be selected as appropriate depending on the application thereof. The content is, however, preferably 10 to 100 mass parts, more preferably 20 to 80 mass parts, and most preferably 30 to 60 mass parts, per 100 mass parts of the polymer.

The filler contained in an amount of at least 10 mass parts exhibits its effect, and the filler contained in an amount of at most 100 mass parts can be sufficiently blended into the polymer. The filler contained in that amount can improve the performance of the polymer composition.

The polymer composition containing the filler in an amount within the above "more preferable" or "most preferable" range is advantageous in terms of balance between the process ability, low-loss performance, and durability.

<<Carbon Black>>

The carbon black is not particularly limited and may be selected as appropriate depending on the application thereof. Examples of the carbon black include FEF, GPF, SRF, HAF, N339, IISAF, ISAF, SAF. These carbon blacks may be used alone or in combination of two or more.

The nitrogen adsorption specific surface area of the carbon black, which is determined according to $N_2SA$ JIS K 6217-2: 2001, is not particularly limited and may be selected as appropriate depending on the application thereof. However, it is preferably 20 to 150 $m^2/g$, and more preferably 35 to 145 $m^2/g$.

The polymer composition having the carbon black with at least 20 $m^2/g$ nitrogen adsorption specific surface area ($N_2SA$) can prevent deterioration in durability of the obtained polymer composition, thereby achieving sufficient crack growth resistance. The polymer composition having the carbon black with at most 100 m²/g nitrogen adsorption specific surface area (N₂SA) can improve low-loss performance, thereby enhancing workability.

The content of the carbon black per 100 mass parts of the polymer is not particularly limited and may be selected as appropriate depending on the application thereof. However, it is preferably 10 to 100 mass parts, more preferably 10 to 70 mass parts, and most preferably 20 to 60 mass parts.

The polymer composition containing the carbon black in an amount of at least 10 mass part can prevent decline in breaking resistance caused by insufficient reinforcement, and the polymer composition containing at most 100 mass parts carbon black can prevent deterioration in processability and low-loss performance.

The polymer composition containing the carbon black in an amount within the above "more preferable" or "most preferable" range is advantageous in terms of maintaining a balance between each of the performances.

<<Inorganic Filler>>

The inorganic filler is not particularly limited, except for the silica contained in the polymerization catalyst composition, and may be selected as appropriate depending on the application thereof. Examples of the inorganic filler include aluminum hydroxide, clay, alumina, talc, mica, kaolin, glass balloon, glass beads, calcium carbonate, magnesium carbonate, magnesium hydroxide, magnesium oxide, titanium oxide, potassium titanate, and barium sulfate. These inorganic fillers may be used alone or in combination of two or more.

In using the above-described inorganic filler, a silane coupling agent may be used as appropriate.

<Crosslinking Agent>

The crosslinking agent is not particularly limited and may be selected as appropriate depending on the application thereof. Examples of the crosslinking agent include a sulfur-containing crosslinking agent, an organic peroxide-containing crosslinking agent, an inorganic crosslinking agent, a polyamine crosslinking agent, a resin crosslinking agent, a sulfur compound-based crosslinking agent, and an oxime-nitrosamine-based crosslinking agent, with the sulfur-containing crosslinking agent being more preferred.

The content of the crosslinking agent is not particularly limited and may be selected as appropriate depending on the application thereof. The preferred content thereof is, however, 0.1 to 20 mass parts per 100 mass parts of the polymer. The polymer composition containing the crosslinking agent in an amount of at least 0.1 mass parts can develop crosslinking, and the polymer composition containing the crosslinking agent in an amount of at most 20 mass parts can prevent the crosslinking that may be caused by part of the crosslinking agent during kneading, and can prevent the loss of physical properties of vulcanizate.

<<Other Components>>

The polymer composition may further contain a vulcanization accelerator in addition to the above components. Examples of compounds that can be used as the vulcanization accelerator include guanidine-based compounds, aldehyde-amine-based compounds, aldehyde-ammonia-based compounds, thiazole-based compounds, sulfenamide-based compounds, thiourea-based compounds, thiuram-based compounds, dethiocarbamate-based compounds, and xanthate-based compounds.

Further, if necessary, any known agent such as a softening agent, a vulcanizing co-agent, a colorant, a flame retardant, a lubricant, a foaming agent, a plasticizer, a processing aid, an antioxidant, an age resister, an anti-scorch agent, an ultraviolet rays protecting agent, an antistatic agent, a color protecting agent, and other compounding agents may be used according to the intended use thereof.

(Crosslinked Polymer Composition)

The polymer composition of the present invention can be crosslinked to be used as a crosslinked polymer composition.

The crosslinked polymer composition is not particularly limited as long as being obtained by crosslinking the polymer composition of the present invention, and may be selected as appropriate depending on the application thereof.

The conditions of the crosslinking are not particularly limited and may be selected as appropriate depending on the application thereof. However, a preferred temperature is 120° C. to 200° C. and a preferred heating time is 1 to 900 minutes.

EXAMPLES

In the following, the present invention will be described in further detail with reference to Examples. However, the present invention is in no way limited to the following Examples.

Example 1

Production of Silica-Containing Polymer A

To obtain silica-containing polymer A, 5.0 g of silica (trade name: Nipsil AQ, water content calculated from weight loss: 5.5 wt %, manufactured by Tosoh Silica Corporation), 40.0 g of toluene, 10.0 mmol of trimethylaluminum (manufactured by Tosoh Finechem Corporation), and 10.0 mmol of triisobutylaluminum (manufactured by Tosoh Finechem Corporation) were placed in a 1 L pressure-resistant glass reactor in a glove box under nitrogen atmosphere, and the compounds were mixed and aged for 30 minutes at room temperature. Subsequently, 68 mg (100 μmol) of bis(2-phenylindenyl)gadolinium bis(dimethylsilylamide) [(2-PhC₉H₆)₂GdN(SiHMe₂)₂] was placed in the reactor and the compounds were further aged for 60 minutes at room temperature. The reactor was then taken out from the glove box, and 530.0 g of toluene solution containing 100.0 g (1.85 mol) of 1,3-butadiene was added to the reactor, followed by polymerization for 180 minutes at 50° C. After the polymerization, 1 mL of isopropanol solution containing 5 wt % 2,2'-methylene-bis(4-ethyl-6-t-butylphenol phenol) (NS-5) was added to the reactor to stop the reaction, and the silica-containing polymers were isolated with large amounts of methanol and dried at 70° C. in vacuum to obtain silica-containing polymer A. The yield of silica-containing polymer A thus obtained was 88.0 g.

Example 2

Production of Silica-Containing Polymer B

To obtain silica-containing polymer B, 5.0 g of silica (trade name: Nipsil AQ, water content calculated from weight loss: 5.5 wt %, manufactured by Tosoh Silica Corporation), 55.0 g of normal hexane, 12.0 mmol of trimethylaluminum (manufactured by Tosoh Finechem Corporation), and 20.0 mmol of triisobutylaluminum (manufactured by Tosoh Finechem Corporation) were placed in a 1 L pressure-resistant glass reactor in a glove box under nitrogen atmosphere, and the compounds were mixed and aged for 30 minutes at room temperature. Subsequently, 68 mg (100 μmol) of bis(2-phenylindenyl)gadolinium bis(dimethylsilylamide) [(2-PhC₉H₆)₂GdN(SiHMe₂)₂] was placed in the reactor and the compounds were further aged for 60 minutes at room temperature. The reactor was then taken out from the glove box, and 350.0 g of normal hexane solution containing 80.0 g (1.48 mol) of 1,3-butadiene was added to the reactor, followed by polymerization for 180 minutes at 65° C. After the polymerization, 1 mL of isopropanol solution containing 5 wt % 2,2'-methylene-bis(4-ethyl-6-t-butylphenol phenol) (NS-5) was added to the reactor to stop the reaction, and the silica-containing polymers were isolated with large amounts of methanol and dried at 70° C. in vacuum to obtain silica-containing polymer B. The yield of silica-containing polymer B thus obtained was 70.0 g.

Example 3

Production of Silica-Containing Polymer C

To obtain silica-containing polymer C, 3.0 g of silica (trade name: Nipsil AQ, water content calculated from weight loss: 5.5 wt %, manufactured by Tosoh Silica Corporation), 25.0 g of normal hexane, 12.8 mmol of trimethylaluminum (manufactured by Tosoh Finechem Corporation), and 3.2 mmol of diisobutylaluminum hydride (manufactured by Tosoh Finechem Corporation) were placed in a 1 L pressure-resistant glass reactor in a glove box under nitrogen atmosphere, and the compounds were mixed and aged for 30 minutes at room temperature. Subsequently, 43 mg (64 µmol) of bis(2-phenylindenyl)gadolinium bis(dimethylsilylamide) [(2-PhC$_9$H$_6$)$_2$GdN(SiHMe$_2$)$_2$] was placed in the reactor and the compounds were further aged for 60 minutes at room temperature. The reactor was then taken out from the glove box, and 400.0 g of normal hexane solution containing 80.0 g (1.48 mol) of 1,3-butadiene was added to the reactor, followed by polymerization for 300 minutes at 65° C. After the polymerization, 1 mL of isopropanol solution containing 5 wt % 2,2'-methylene-bis(4-ethyl-6-t-butylphenol phenol) (NS-5) was added to the reactor to stop the reaction, and the silica-containing polymers were isolated with large amounts of methanol and dried at 70° C. in vacuum to obtain silica-containing polymer C. The yield of silica-containing polymer C thus obtained was 77.0 g.

Example 4

Production of Silica-Containing Polymer D

To obtain silica-containing polymer D, 5.0 g of silica (trade name: Nipsil AQ, water content calculated from weight loss: 5.5 wt %, manufactured by Tosoh Silica Corporation), 60.0 g of normal hexane, 16.0 mmol of trimethylaluminum (manufactured by Tosoh Finechem Corporation), and 3.2 mmol of triisobutylaluminum (manufactured by Tosoh Finechem Corporation) were placed in a 1 L pressure-resistant glass reactor in a glove box under nitrogen atmosphere, and the compounds were mixed and aged for 30 minutes at room temperature. Subsequently, 22 mg (32 µmol) of bis(2-phenylindenyl)gadolinium bis(dimethylsilylamide) [(2-PhC$_9$H$_6$)$_2$GdN(SiHMe$_2$)$_2$] was placed in the reactor and the compounds were further aged for 60 minutes at room temperature. The reactor was then taken out from the glove box, and 320.0 g of normal hexane solution containing 80.0 g (1.48 mol) of 1,3-butadiene was added to the reactor, followed by polymerization for 90 minutes at 80° C. After the polymerization, 1 mL of isopropanol solution containing 5 wt % 2,2'-methylene-bis(4-ethyl-6-t-butylphenol phenol) (NS-5) was added to the reactor to stop the reaction, and the silica-containing polymers were isolated with large amounts of methanol and dried at 70° C. in vacuum to obtain silica-containing polymer D. The yield of silica-containing polymer D thus obtained was 26.5 g.

Example 5

Production of Silica-Containing Polymer E

To obtain silica-containing polymer E, 8.0 g of silica (trade name: Nipsil AQ, water content calculated from weight loss: 5.5 wt %, manufactured by Tosoh Silica Corporation), 80.0 g of normal hexane, 16.0 mmol of trimethylaluminum (manufactured by Tosoh Finechem Corporation), and 16.0 mmol of triisobutylaluminum (manufactured by Tosoh Finechem Corporation) were placed in a 1 L pressure-resistant glass reactor in a glove box under nitrogen atmosphere, and the compounds were mixed and aged for 30 minutes at room temperature. Subsequently, 22 mg (32 µmol) of bis(2-phenylindenyl)gadolinium bis(dimethylsilylamide) [(2-PhC$_9$H$_6$)$_2$GdN(SiHMe$_2$)$_2$] was placed in the reactor and the compounds were further aged for 60 minutes at room temperature. The reactor was then taken out from the glove box, and 320.0 g of normal hexane solution containing 80.0 g (1.48 mol) of 1,3-butadiene was added to the reactor, followed by polymerization for 240 minutes at 80° C. After the polymerization, 1 mL of isopropanol solution containing 5 wt % 2,2'-methylene-bis(4-ethyl-6-t-butylphenol phenol) (NS-5) was added to the reactor to stop the reaction, and the silica-containing polymers were isolated with large amounts of methanol and dried at 70° C. in vacuum to obtain silica-containing polymer E. The yield of silica-containing polymer E thus obtained was 78.5 g.

Example 6

Production of Silica-Containing Polymer F

Subsequently, 21 mg (32 µmol) of tris bistrimethylsilylamide gadolinium [Gd[N(SiMe$_3$)$_2$]$_3$] was placed in the reactor and the compounds were further aged for 30 minutes at room temperature. The reactor was then taken out from the glove box, and 320.0 g of normal hexane solution containing 80.0 g (1.48 mol) of 1,3-butadiene was added to the reactor, followed by polymerization for 480 minutes at 80° C. After the polymerization, 1 mL of isopropanol solution containing 5 wt % 2,2'-methylene-bis(4-ethyl-6-t-butylphenol phenol) (NS-5) was added to the reactor to stop the reaction, and the silica-containing polymers were isolated with large amounts of methanol and dried at 70° C. in vacuum to obtain silica-containing polymer F. The yield of silica-containing polymer F thus obtained was 66.0 g.

Comparative Example 1

Polymerization was performed in a manner similar to that performed for Example 1 except that silica was not placed. No polymer was generated.

Comparative Example 2

Polymer G

Polybutadiene Rubber manufactured by Ube Industries, LTD. (UBEPOL BR 150, hereinafter referred to as "150 L butadiene") was used as Comparative Example 2.

Comparative Example 3

Production of Silica-Containing Polymer H

To obtain silica-containing polymer H, 125 g of 150 L butadiene was dissolved in cyclohexane, and 5 g of silica (trade name: Nipsil AQ, water content calculated from weight loss: 5.5 wt %, manufactured by Tosoh Silica Corporation) was added to the solution. The solution was then stirred for 1 hour at 50° C. After that, the silica-containing polymers were isolated with large amounts of methanol and dried at 70° C. in vacuum to obtain 130 g of silica-containing polymer H (150 L wet-processed butadiene).

Polymers A to H prepared as above were measured and evaluated with the following method to investigate the microstructure (cis-1,4 bond content), the number average molecular weight (Mn), and the molecular weight distribution (Mw/Mn).

<Analysis Method of Polymers A to H>

(1) Microstructure (Cis-1,4 bond content)

The microstructures (cis-1,4 bond content) of polymers A to H were calculated by measuring their spectral transmittances using Fourier-transform infrared spectroscopy (FT-IR). Specifically, carbon disulfide solutions of polymers A to H adjusted to 5 mg/mL concentration were prepared and the spectral transmittances of the carbon disulfide solutions of the samples were measured by FT-IR using carbon disulfide in the same cell as blank. Values e, f, and g were then obtained from the following determinant:

[Expression 1]

$$\begin{bmatrix} 1.7455 & 0 & -0.0151 \\ -0.0454 & 0.4292 & -0.0129 \\ -0.007 & 0 & 0.3746 \end{bmatrix} \begin{bmatrix} \log_{10}(a/d) \\ \log_{10}(a/b) \\ \log_{10}(a/c) \end{bmatrix} = \begin{bmatrix} e \\ f \\ g \end{bmatrix} \quad (i)$$

wherein a represents the peak value near the spectral transmittance of 1130 cm$^{-1}$ measured by FT-IR, b represents the valley value near 967 cm$^{-1}$, c represents the valley value near 911 cm$^{-1}$, and d represents the valley value near 736 cm$^{-1}$.

With the obtained values e, f, and g, the calculation values of the cis-1,4 bond content for the polymers A to H were obtained using the following expression:

$$\text{Calculated value of cis-1,4 bond content} = e/(e+f+g) \times 100 \quad (ii)$$

(2) Number Average Molecular Weight (Mn) and Molecular Weight Distribution (Mw/Mn) of Polymers A to H The number average molecular weights (Mn) and molecular weight distributions (Mw/Mn) were obtained for polymers A to H by using gel permeation chromatography [GPC: HLC-8220 GPC manufactured by Tosoh Corporation, Column: Two of GMH$_{XL}$'s manufactured by Tosoh Corporation, Detector: differential refractometer (RI)], by referencing monodisperse polystyrene as a standard. The measurement temperature was 40° C. The elution solvent was tetrahydrofuran (THF).

<Evaluation Method of Polymer Compositions>

Polymer compositions having the formulation shown in Table 2 were prepared with polymers A to H and subjected to vulcanization for 33 minutes at 145° C. to obtain vulcanized polymer compositions. Each of the vulcanized polymer compositions were investigated to measure (1) loss tangent (tan δ), (2) breaking resistance, and (3) abrasion resistance, using the following methods. The measurement results are shown in Table 1.

(1) Loss Tangent (Represented as Tan δ)

A test piece was prepared from each of the vulcanized polymer compositions and tan δ was measured for each test piece by using a viscoelastic spectrometer manufactured by Toyo Seiki Co., Ltd. under the following conditions: initial load: 160 g, dynamic strain: 2%, frequency: 52 Hz, temperature: 25° C. Smaller tan δ values indicate lower heat generation property.

(2) Breaking Resistance (Expressed by Index)

A tensile test was conducted at room temperature in accordance with JIS K 6301-1995 to measure the tensile strength (Tb) of the vulcanized polymer compositions. The tensile strengths, expressed by an index obtained by determining the tensile strength of Comparative Example 3 as 100, are shown in Table 1. Greater index values indicate better breaking resistance.

(3) Abrasion Resistance (Expressed by Index)

The amount of abrasion was measured with a Lambourn abrasion testing machine at a slip rate of 60% at room temperature. The abrasion resistance was expressed by an index obtained by using the reciprocal of the abrasion mount of Comparative Example 3 as 100. Greater index values indicate better abrasion resistance

TABLE 1

|  |  | Ex. 1 | Ex. 2 | Ex. 3 | Ex. 4 | Ex. 5 | Ex. 6 | Com. Ex. 2 | Com. Ex. 3 |
|---|---|---|---|---|---|---|---|---|---|
| Polymer | Silica-containing polymer | A | B | C | D | E | F | 150 L G | 150 L wet processed H |
|  | Mn (×10$^3$) | 189 | 185 | 191 | 154 | 212 | 225 | 218 | 218 |
|  | Mw/Mn | 2.2 | 3.9 | 2.9 | 3.7 | 3.2 | 2.1 | 2.2 | 2.2 |
|  | Cis-1,4 bond content (%) | 99 | 97 | 97 | 98 | 97 | 98 | 97 | 97 |
|  | Amount of silica added (wt pt) | 6.0 | 7.7 | 5.7 | 4.0 | 4.0 | 4.0 | 0 | 4.0 |
| Physical Properties of composition | tan δ | 95 | 94 | 98 | 60 | 53 | 95 | 100 | 98 |
|  | Breaking resistance | 108 | 113 | 108 | 103 | 103 | 107 | 100 | 96 |
|  | Abrasion resistance | 115 | 123 | 112 | 103 | 102 | 113 | 100 | 95 |

TABLE 2

| | Component | Mass part |
|---|---|---|
| Master batch | Polymer*[1] | 100.0 |
| | Silica*[2] | 55.0 |
| | Softening agent*[3] | 10.0 |
| | Silane coupling agent*[4] | 5.5 |
| | Stearic acid | 2.0 |
| | Antioxidant 6C*[5] | 1.0 |
| Final batch | Zinc white | 2.5 |
| | DPG | 0.5 |
| | Vulcanization accelerator MZ*[6] | 1.0 |
| | Vulcanization accelerator NS *[7] | 1.5 |
| | Sulfur | 1.3 |

*[1]Polymers A to H
*[2]Nipsil AQ manufactured by Tosoh Silica Corporation
*[3]Trade name "A/O mix" (process oil) manufactured by Sankyo Yuka Kogyo K.K.
*[4]Trade name "Si 75" manufactured by Degussa AG
*[5]N-(1,3-dimethylbutyl)-N'-p-phenylenediamine manufactured by Ouchi Shinko Chemical Industrial Co., Ltd., NOCRAC 6C
*[6]NOCCELER MZ manufactured by Ouchi Shinko Chemical Industrial Co., Ltd.
*[7] NOCCELER NS manufactured by Ouchi Shinko Chemical Industrial Co., Ltd.

The results of Table 1 demonstrate that the use of the polymerization catalyst composition of the present invention enables synthesis of polymers that have high cis-1,4 bond content as well as synthesis of polymer compositions that have high abrasion and breaking resistance and low heat generation property.

INDUSTRIAL APPLICABILITY

The method for producing a polymerization catalyst composition, the polymerization catalyst composition produced by the method, the method for producing a polymer composition, and the polymer composition produced by the method, according to the present invention, can be suitably used in rubber products or production of the rubber products that require addition of silica, such as tire members (particularly tread members of a tire).

The invention claimed is:

1. A method for producing a polymer composition, comprising:
    forming a polymer component by polymerizing at least one of a conjugated diene compound and a unconjugated olefin in the presence of a polymerization catalyst composition obtained by
    mixing and aging a second element and a third element, and then adding a first element to the mixture to react the first element with the mixture,
    wherein the first element is a compound that contains a rare earth element (REE-containing compound) wherein the REE-containing compound contains a rare earth element compound (REE compound) or a reactant of the REE compound with a Lewis base,
    the second element contains a compound represented by the following formula (X):

$$YR^1{}_a R^2{}_b R^3{}_c \quad (X)$$

wherein:
    Y is a metal selected from Group 1, Group 2, Group 12, and Group 13 of the periodic table; $R^1$ and $R^2$ are hydrogen atoms or hydrocarbon groups each having 1 to 10 carbon atoms; and $R^3$ is a hydrocarbon group having 1 to 10 carbon atoms, $R^1$, $R^2$, and $R^3$ are the same as or different from each other, with a being 1 and b and c both being 0 when Y is a metal selected from Group 1 of the periodic table, a and b being 1 and c being 0 when Y is a metal selected from Group 2 and Group 12 of the periodic table, and a, b, and c are all 1 when Y is a metal selected from Group 13 of the periodic table, and the third element contains silica;
    wherein the first element contains a complex represented by the following general formula (i) or (ii):

$$MX_2 \cdot Lw \quad (i)$$

$$MX_3 \cdot Lw \quad (ii)$$

wherein:
    M represents a lanthanoid element, scandium, or yttrium; X each independently represent a hydrogen atom, a halogen atom, an alkoxy group, a thiolate group, an amide group, a silyl group, an aldehyde residue, a ketone residue, a carboxylic acid residue, a thicarboxylic acid residue, a phosphorous compound residue, a substituted or unsubstituted cyclopentadienyl, or a substituted or unsubstituted indenyl; L represents a Lewis base; and w represents 0 to 3; and
    wherein water content of the third element is 0.1 wt % or more.

2. The method for producing the polymer composition according to claim 1, wherein the third element is contained in the polymerization catalyst composition in an amount of more than 0 weight parts and less than or equal to 100 weight parts per 100 weight parts of monomer forming the polymer component, when expressed in terms of dehydrated weight.

3. The method for producing the polymer composition according to claim 1, wherein the REE compound and the reactant of the REE compound with the Lewis base do not have a bond between the rare earth element and the carbon.

4. The method for producing the polymerization catalyst composition according to claim 1, wherein the second element is represented by the following general formula (Xa):

$$AlR^1 R^2 R^3 \quad (Xa)$$

wherein:
$R^1$ and $R^2$ are hydrogen atoms or hydrocarbon groups each having 1 to 10 carbon atoms; and $R^3$ is a hydrocarbon group having 1 to 10 carbon atoms, in which $R^1$, $R^2$, and $R^3$ are the same as or different from each other.

* * * * *